June 6, 1944.　　　M. MENNESSON　　　2,350,791
AUXILIARY MOTOR DEVICE FOR DRIVING LIGHT VEHICLES
Filed June 12, 1941　　　3 Sheets-Sheet 1
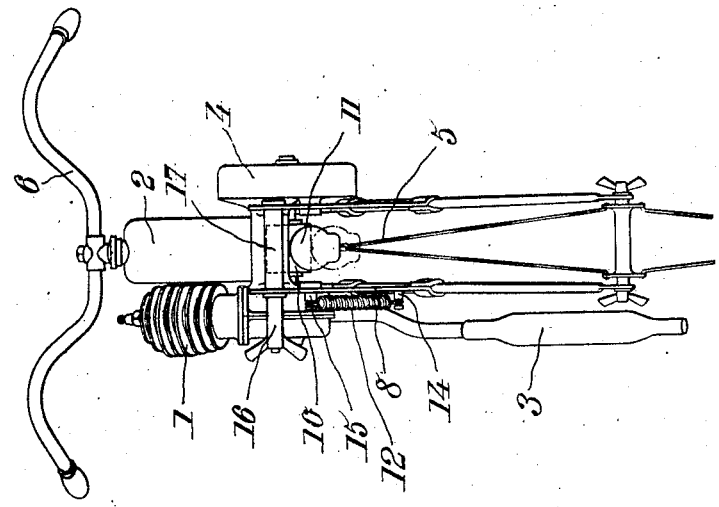
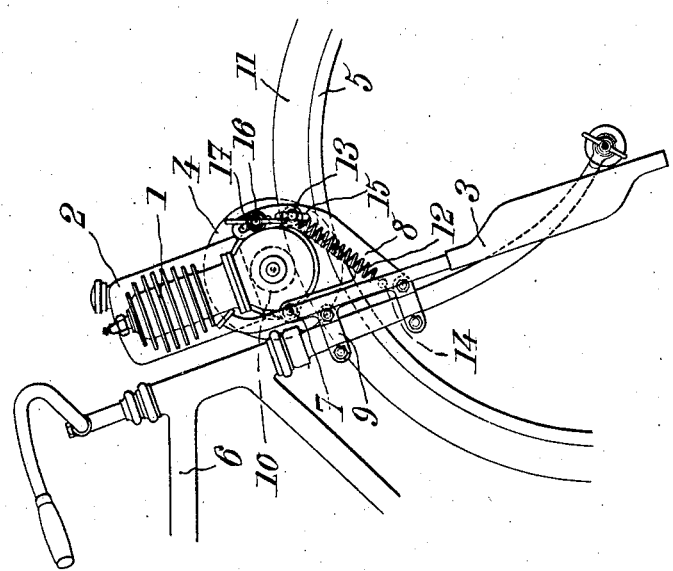
INVENTOR
MARCEL MENNESSON,
BY Bailey, Stephens & Huettig
ATTORNEYS June 6, 1944. M. MENNESSON 2,350,791
AUXILIARY MOTOR DEVICE FOR DRIVING LIGHT VEHICLES
Filed June 12, 1941 3 Sheets-Sheet 2
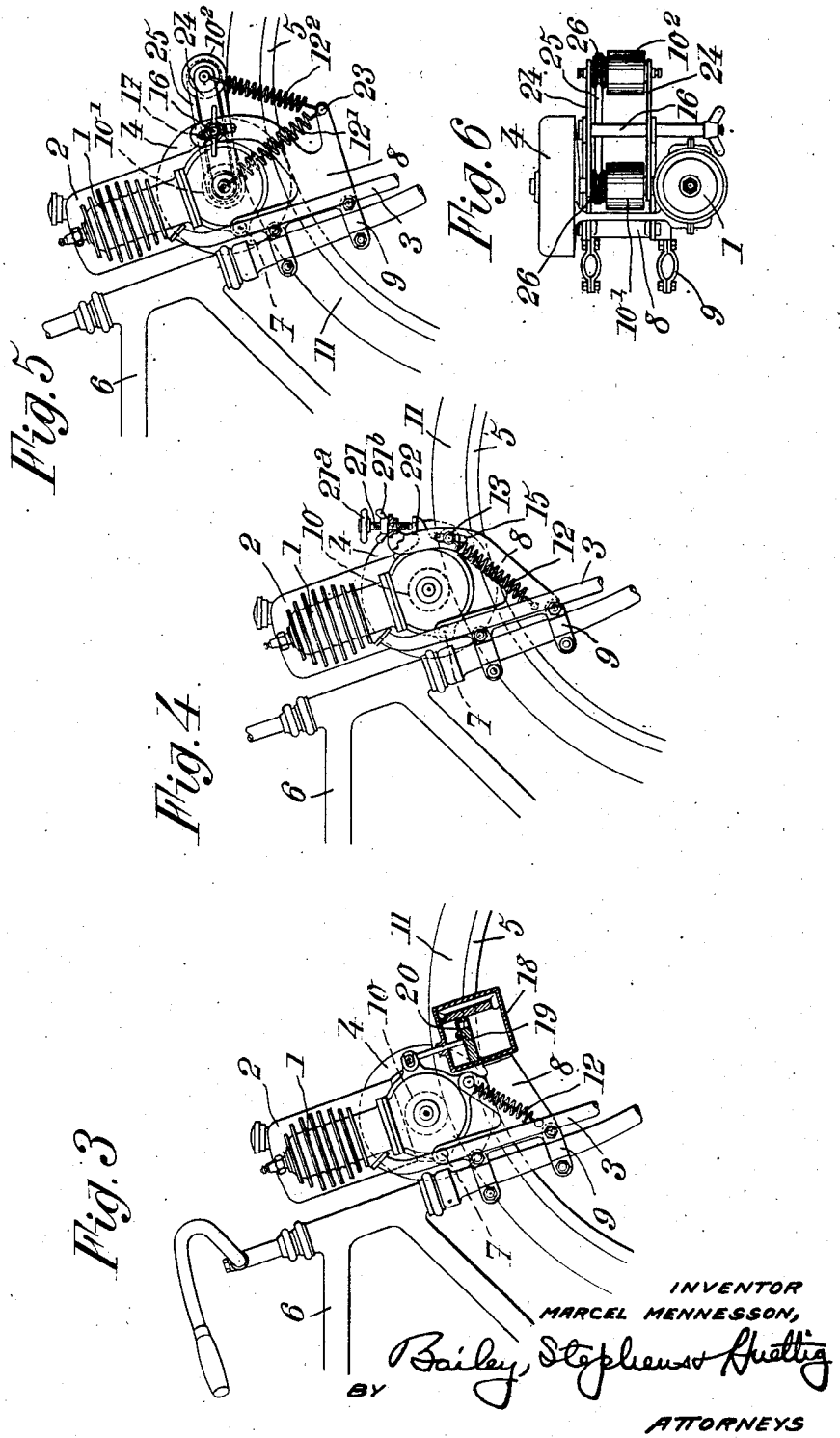
INVENTOR
MARCEL MENNESSON,
BY Bailey, Stephens & Huettig
ATTORNEYS June 6, 1944.　　　M. MENNESSON　　　2,350,791
AUXILIARY MOTOR DEVICE FOR DRIVING LIGHT VEHICLES
Filed June 12, 1941　　　3 Sheets-Sheet 3

INVENTOR
MARCEL MENNESSON,
BY
ATTORNEYS

Patented June 6, 1944

2,350,791

UNITED STATES PATENT OFFICE 2,350,791

AUXILIARY MOTOR DEVICE FOR DRIVING LIGHT VEHICLES

Marcel Mennesson, Neuilly-sur-Seine, France; vested in the Alien Property Custodian Application June 12, 1941, Serial No. 397,812
In France November 12, 1940

3 Claims. (Cl. 180—31)

The present invention relates to auxiliary motor devices for driving light vehicles (such as bicycles, tricycles, invalid cars, etc.), these devices being of the kind including an auxiliary motor driving one of the wheels of the vehicle through a roller acting by contact and adhesion on said wheel.

The object of the present invention is to provide a device of this kind which is better adapted to meet the requirements of practice than those used up to the present time, and, in particular which ensures a permanent and better contact of the wheel to be driven and the driving wheels.

According to a feature of the present invention, such a device includes elastic means interposed between, on the one hand, the means for supporting the roller above mentioned, and, on the other hand, a part (either fixed or pivoting) of the frame or chassis of the vehicle, so as to apply said roller with a predetermined pressure against the wheel to be driven, the device further including retaining means (constituted by a locking system, a dash-pot, an adjustable abutment, a ratchet system or the like) for maintaining the desired pressure of application of the roller or rollers on the wheel and opposing or preventing any movement which might tend to bring the roller away from the wheel.

According to another feature of the present invention, the wheel is driven by the motor device above referred to through two or more rollers simultaneously driven by the motor and one of which is advantageously directly driven by the motor (for instance mounted on the shaft of said motor), the support of these rollers being pivotally mounted in such manner to a part of the vehicle frame that the pressure exerted on the wheel to be driven is distributed, in a substantially equal manner, among the various rollers.

According to still another feature of the invention, the wheel is driven by a motor device of the type above referred to through two rollers, one of which is advantageously directly driven by the motor, about the peripheries of which a belt is stretched so as to drive the wheel by adhesion, and the whole is mounted in such manner, with respect to the frame of the vehicle, that the pressure exerted on the wheel to be driven is distributed, in a substantially uniform manner, over the whole length of the portion of said belt which is in contact with the wheel.

Other features of the present invention will result from the following detailed description of some specific embodiments thereof.

Preferred embodiments of the present invention will be hereinafter described, with reference to the accompanying drawings, given merely by way of example, and in which:

Fig. 1 is a side view of a motor device for use on a bicycle, made according to a first embodiment of the invention;

Fig. 2 is a front elevational view corresponding to Fig. 1;

Fig. 3 is a side view showing a modification of such a device;

Fig. 4 is a view, similar to Fig. 3, showing another modification;

Fig. 5 is a side view, similar to Fig. 1, showing another motor device made according to a second embodiment of the invention;

Fig. 6 is a plan view corresponding to Fig. 5, the bicycle being not shown;

Figure 7:
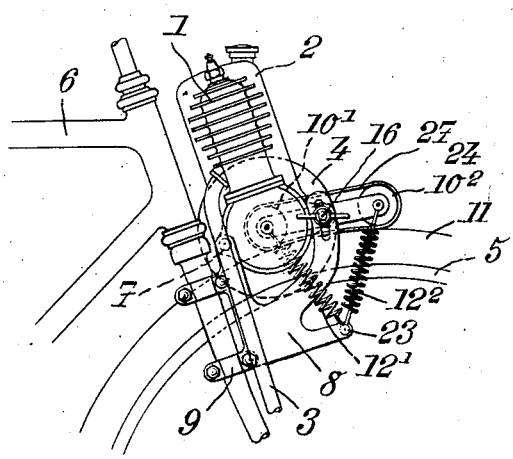
Fig. 7 is a view, similar to Fig. 5, showing a third embodiment of the invention.

In the following description, the invention will be set forth as applied to the case of a bicycle which is to be fitted with an auxiliary motor device of the type above mentioned.

However, it should be well understood that the invention is not in any way limited to this application and that any light vehicle can be driven through identical or analogous means.

Furthermore, it has been supposed, in the following description, by way of example, that the motor used for driving the bicycle is constituted by an internal combustion engine of any suitable type. As this engine in itself does not constitute the subject matter of the invention, it has been deemed unnecessary to show all the parts thereof in detail and the drawings merely show the engine proper, at 1, the fuel tank 2, the exhaust pipe 3, and the fly-wheel 4.

The whole of this driving engine and of the parts associated therewith, which will be hereinafter called "motor unit," is pivoted, through an axis 7, to a support 8 fixed through any suitable means 9 to the arms of the steering fork of the bicycle.

Preferably, these fixation means are constituted by straps secured by means of bolts, with the interposition of rubber or similar sleeves between said straps and the arms of the fork which support them.

In the embodiments of the invention illustrated by Figs. 1 to 4, it has been supposed that the wheel 5 of the bicycle is driven through a single roller 10 bearing upon the tire 11 of said wheel. This roller is directly fixed on the shaft of the engine but of course it might be driven by said engine through any suitable drive, such for instance as gear wheels, a belt, a chain, etc.

There are known motor devices of this kind, but they have the disadvantage that, as a consequence of the shocks produced by the rough surface of the road, the inertia effects undergone by the motor unit and transmitted to roller 10 are opposed only by the weight of said motor unit, so that the pressure of roller 10 on tire 11 is variable. It follows that, when engine 11 and roller 10 are thrown upwardly by a shock, the adhesion of the roller decreases, so that the engine will race. In this case, when the roller is again brought back into contact with the tire, there is considerable slipping between them and the resulting friction is a cause of rapid wear and tear of the tire.

According to the present invention, adhesion between the driving roller 10 and the wheel tire 11 is obtained not only by the weight of the motor unit pivoted at 7 to support 8 but also by the action of spring such as 12 interposed between, on the one hand, said motor unit at 13, and, on the other hand, said support at 14. The spring is given a suitable preliminary tension so as to produce the best possible pressure for driving wheel 5 by adhesion.

Advantageously, the means 13 for fixing spring 12 to the motor unit are advantageously constituted by a pin carried by said motor unit and engaged, in a slidable manner, in arcuate slots 15 provided in arms belonging to support 8, said arcuate slots having their centers on the pivotal axis at 7. It follows that the motor unit is urged by spring 12 in such manner that the position of roller 10, when said roller is applied on tire 11, permits of obtaining the best possible pressure, pin 13 moving in slots 15.

In order to oppose or to prevent any angular movement of the motor unit with respect to axis 7 under the effect of shocks taking place when the bicycle is running and in order to maintain the best possible pressure obtained as above explained, I make use of locking or braking means which may, for instance, be made as follows:

In the embodiment of Figs. 1 and 2, these means consist of positive locking means and they are constituted by a screw 16 having a butterfly head, engaged in a passage provided in a portion 17 of the motor unit located between the arms of support 8. This screw is adapted freely to slide in arcuate slots 17' provided in said arms on either side of said portion 17.

Screw 16 is so positioned that it can easily be reached by the cyclist's arm, whereby the latter can, without difficulty, operate said screw so as either to release, or, on the contrary, to lock the motor unit. If the cyclist is careful, from time to time, to release said locking screw 16 and then again to screw it, the motor unit is automatically adjusted in the proper position with respect to the wheel, whatever be the degree of inflation of the tire thereof.

In the modification illustrated by Fig. 3, the locking screw 16 is replaced by a dash-pot which prevents relative movement of the motor unit with respect to the wheel in only one direction, to wit that corresponding to a displacement of the roller away from the wheel.

In this embodiment, the cylinder 18 of the dash pot is fixed to support 8 and the piston 19 thereof, provided with a check valve 20, is carried by the motor unit, or inversely. The circulation of oil or the like through said dashpot device is arranged in such manner that the upward movement of piston 19 is braked, while the downward movement thereof takes place freely owing to the fact that check valve 20 then opens.

In the modification shown by Fig. 4, the unidirectional retaining means are constituted by adjustable abutment 21, formed by a threaded rod, provided at the top with a hand-wheel 21a, and carrying a nut 21b for fixing it in a predetermined position with respect to support 8, by which it is carried. This threaded rod cooperates with a projection 22 carried by the motor unit and so positioned that, when the adjustable abutment 21 is in contact with said projection 22, the upward displacement of said motor unit about axis 7 is positively prevented.

It should be noted that the object to be obtained, when making use of the retaining means above described, is not to prevent to deep a depression of the tire by the roller but to oppose too considerable a rebounding under the effect of a shock due to the uneven surface of the road. As a matter of fact, if the motor unit thus rebounds, when the roller is brought back into contact with the tire, due to the very high speed of revolution imparted thereto by the engine which is then racing, produces a very injurious friction on the wheel tire, due to the great difference of the velocities of said roller and said wheel tire when they come back into contact with each other.

It might be objected that such a fixation device does not permit of disconnecting the engine from the wheel by moving roller 10 away from tire 11 through a pivoting displacement of the motor unit with respect to support 8 about axis 7. It is known that there are systems including a pivoted motor unit owing to which the cyclist, by acting on a handle within reach of his hand, can lift the motor unit clear from the tire and thus destroy any contact between the wheel and the driving means (such as roller 10). It should be noted that, in all systems of the type with which the invention is concerned, such an operation is unnecessary because it suffices to open a pressure relief valve provided on the engine. As a matter of fact, it is advisable, in order to reduce the fuel consumption to a minimum, to connect the means for controlling this valve with the means for controlling the feed of fuel so that the fact of opening this valve simultaneously stops the feed of fuel to the engine for the whole period for which the pressure is thus reduced.

Experience has taught that, when use is made of a single roller the diameter of which is necessarily small, in order to obtain the pressure of application of said roller on the tire necessary for ensuring the drive, the weight of the motor unit and the tension of spring 12 must be given values such that the roller projects deeply into the tire and thus causes a quick wear and tear thereof. According to the present invention, this drawback is avoided by making use of several rollers.

In Figs. 5 to 8 of the drawings I have shown several embodiments of such arrangements, in which use is made of two rollers of the same diameter, one of which, $10^1$, is advantageously fixed on the engine shaft, although this is not necessary.

In order that the pressure of rollers $10^1$ and $10^2$ on tire 11 may be equally distributed, each of these rollers must be subjected to the action of a spring, $12^1$ and $12^2$ respectively, fixed at one end to the roller and at the other end to support 8¹. The point of fixation 23 of the springs to said support 8 is advantageously so positioned that the action exerted by these springs is substantially perpendicular to the periphery of tire 11. The axles of rollers 10¹ and 10² are engaged in spacer plates 24 pivoted at the middle thereof on a locking screw 16 analogous to that above described with reference to Figs. 1 and 2 and also movable in arcuate slots 17 provided in support 8¹. Owing to this arrangement, after the butterfly head of this locking screw 16 has been loosened, the whole of plates 24 and rollers 10¹ and 10² is applied with a predetermined pressure, under the effect of springs 12¹ and 12² against the tire, with an equal distribution of the pressure of application of the rollers on the tire, after which it suffices to fix the system of rollers by tightening screw 16.

A belt or chain 25 interconnects pulleys 26 respectively fixed on the axles of rollers 10¹ and 10² so that the latter may be driven at the same speed.

Figure 8:
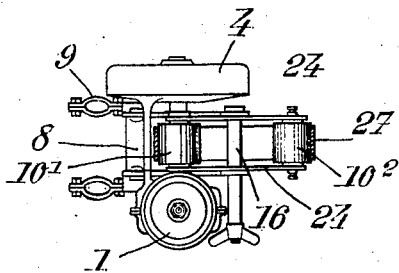
Fig. 8 is a view corresponding to Fig. 7.

In the embodiment illustrated by Figs. 7 and 8, I engage on the peripheries of rollers 10¹ and 10² a belt 27 which not only serves to drive both of the rollers at the same speed but also permits of increasing the surface of contact between tire 11 and the driving rollers. It will be readily understood that the portion of belt 27 which is located between rollers 10¹ and 10² and tire 11 permits of obtaining an area of contact substantially greater and, consequently, a better adhesion. Furthermore, owing to the provision of springs such as 12¹ and 12² arranged as above explained, I obtain a substantially uniform distribution of the pressure over the whole area of this portion of the belt and this uniform distribution will be preserved owing to the provision of retaining means, such as locking screw 16, when the latter is tightened.

It must be noted that the center of gravity of the motor unit must be located substantially in the median plane of the wheel, which can easily be obtained by placing the engine on one side, and the fly-wheel, preferably a magnetic one, on the other side of the wheel. Likewise, the fuel tank 2 is preferably mounted symmetrically with respect to the median plane of the wheel so that the variations of weight of this tank have no influence on the relative position of the center of gravity of the whole with respect to said median plane. Also, the axis of the exhaust pipe 3 of the engine should be substantially in line with the pivot axis of the motor unit.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. In connection with a vehicle having a frame and at least one wheel journaled in part of said frame, a motor system which comprises in combination a support fixed to said frame, a motor unit mounted on said frame, at least one driven roller journaled in said motor unit, in frictional driving contact with said wheel, said roller being movable in a direction toward and away from said wheel, a spring interposed between said support and roller and pressing said roller against said wheel and means preventing movement of said roller out of contact with said wheel and at the same time permitting said spring to press said roller freely against said wheel.

2. In connection with a vehicle having a frame and at least one wheel journaled in part of said frame, a motor system which comprises in combination a support fixed to said frame, a motor unit pivoted to said support about an axis parallel to the axis of said wheel, at least one driven roller journaled in said motor unit in frictional contact with said wheel, a spring interposed between said motor unit and support for pressing said roller against said wheel and cooperating abutment means carried by the motor unit and support respectively for preventing relative rotation thereof to cause movement of said roller out of contact with said wheel and at the same time permitting said spring to press said roller freely against said wheel.

3. In connection with a vehicle having a frame and at least one wheel journaled in part of said frame, a motor system which comprises in combination a support fixed to said frame, a motor unit pivoted to said support about an axis parallel to the axis of said wheel, at least one driven roller journaled in said motor unit in frictional contact with said wheel, a spring interposed between said motor unit and support for pressing said roller against said wheel, abutment means carried by said motor unit and an adjustable screw carried by said support and adapted to be engaged by said abutment means and forming a cooperating abutment means for preventing relative rotation of said motor unit and support in a direction to cause movement of said roller out of contact with said wheel and at the same time permitting said spring to press said roller freely against said wheel.

MARCEL MENNESSON.